US012688537B2

(12) United States Patent
Wang et al.

(10) Patent No.: US 12,688,537 B2
(45) Date of Patent: Jul. 21, 2026

(54) FLOATING PLATFORMS FOR SAMPLING FISH SURVEY IN TIDAL CHANNELS AT HIGH AND LOW TIDES AND QUANTITATIVE ASSESSMENT METHOD

(71) Applicant: East China Sea Fisheries Research Institute, Chinese Academy of Fishery Sciences, Shanghai (CN)

(72) Inventors: Sikai Wang, Shanghai (CN); Feng Zhao, Shanghai (CN); Tingting Zhang, Shanghai (CN); Chao Song, Shanghai (CN); Guangpeng Feng, Shanghai (CN)

( * ) Notice: Subject to any disclaimer, the term of this patent is extended or adjusted under 35 U.S.C. 154(b) by 3 days.

(21) Appl. No.: 19/030,575

(22) Filed: Jan. 17, 2025

(65) Prior Publication Data

US 2026/0044905 A1 Feb. 12, 2026

Related U.S. Application Data

(63) Continuation of application No. PCT/CN2025/071500, filed on Jan. 9, 2025.

(30) Foreign Application Priority Data

Aug. 7, 2024 (CN) ........................ 202411077371.X

(51) Int. Cl.
　*G06Q 50/02* (2024.01)
　*A01K 29/00* (2006.01)
　　　　(Continued)

(52) U.S. Cl.
　CPC ............. *G06Q 50/02* (2013.01); *A01K 29/00* (2013.01); *A01K 74/00* (2013.01); *G01F 1/002* (2013.01)

(58) Field of Classification Search
　CPC ........ G06Q 50/02; A01K 29/00; A01K 74/00; G01F 1/002
　See application file for complete search history.

(56) References Cited

U.S. PATENT DOCUMENTS

2018/0001974 A1　1/2018　Merz
2020/0217032 A1 *　7/2020　Aittaniemi .............. E02B 8/085
2022/0324737 A1 *　10/2022　Ozair ........................ C02F 9/20

FOREIGN PATENT DOCUMENTS

CN　102599117 A　7/2012
CN　104430215 A　3/2015
(Continued)

OTHER PUBLICATIONS

Lane et al., Measuring Fluxes in Tidal Estuaries: Sensitivity to Instrumentation and Associated Data Analyses, 45 Estuarine, Coastal and Shelf Science 433-451 (Year: 1997).*
(Continued)

*Primary Examiner* — Jordan L Jackson

(57) ABSTRACT

A floating platform for sampling fish survey in tidal channels at high and low tides, includes a floating platform frame and a survey sampling net, the survey sampling net includes an opening welded by galvanized tubes. The present application can comprehensively collect aquatic organisms and nutrients in the tidal channels at high tide and low tide by setting up a floating platform to put down the corresponding fishing nets for collection at high tide and low tide respectively, and read the flow meter data for calculating the tidal flow, which can make up for the insufficiency of the relevant data collection in the existing research at high tide, and realize accurate monitoring and quantitative assessment of the tidal channels organisms and material transport, and can comprehensively understand the species, quantity and distribution of the tidal channels organisms and their differences in high and low tide.

6 Claims, 3 Drawing Sheets

(51) Int. Cl.
    *A01K 74/00*        (2006.01)
    *G01F 1/002*        (2022.01)

(56)           References Cited

FOREIGN PATENT DOCUMENTS

| | | | |
|---|---|---|---|
| CN | 205511733 | U | 8/2016 |
| CN | 208012903 | U | 10/2018 |
| CN | 111172958 | A | 5/2020 |
| CN | 114194340 | A | 3/2022 |
| CN | 117091899 | A | 11/2023 |
| CN | 117845852 | A | 4/2024 |

OTHER PUBLICATIONS

Morrison et al., Diurnal and Tidal Variation in the Abundance of the Fish Fauna of a Temperate Tidal Mudflat, 54(5) Estuarine, Costal and Shelf Science 793-807 (May 2002) (Year: 2022).*
Renying Fang, <The Memory for Fuchun River Fish Culture> Zhejiang Literature and Art Publishing House, May 31, 2015, vol. 1.

* cited by examiner

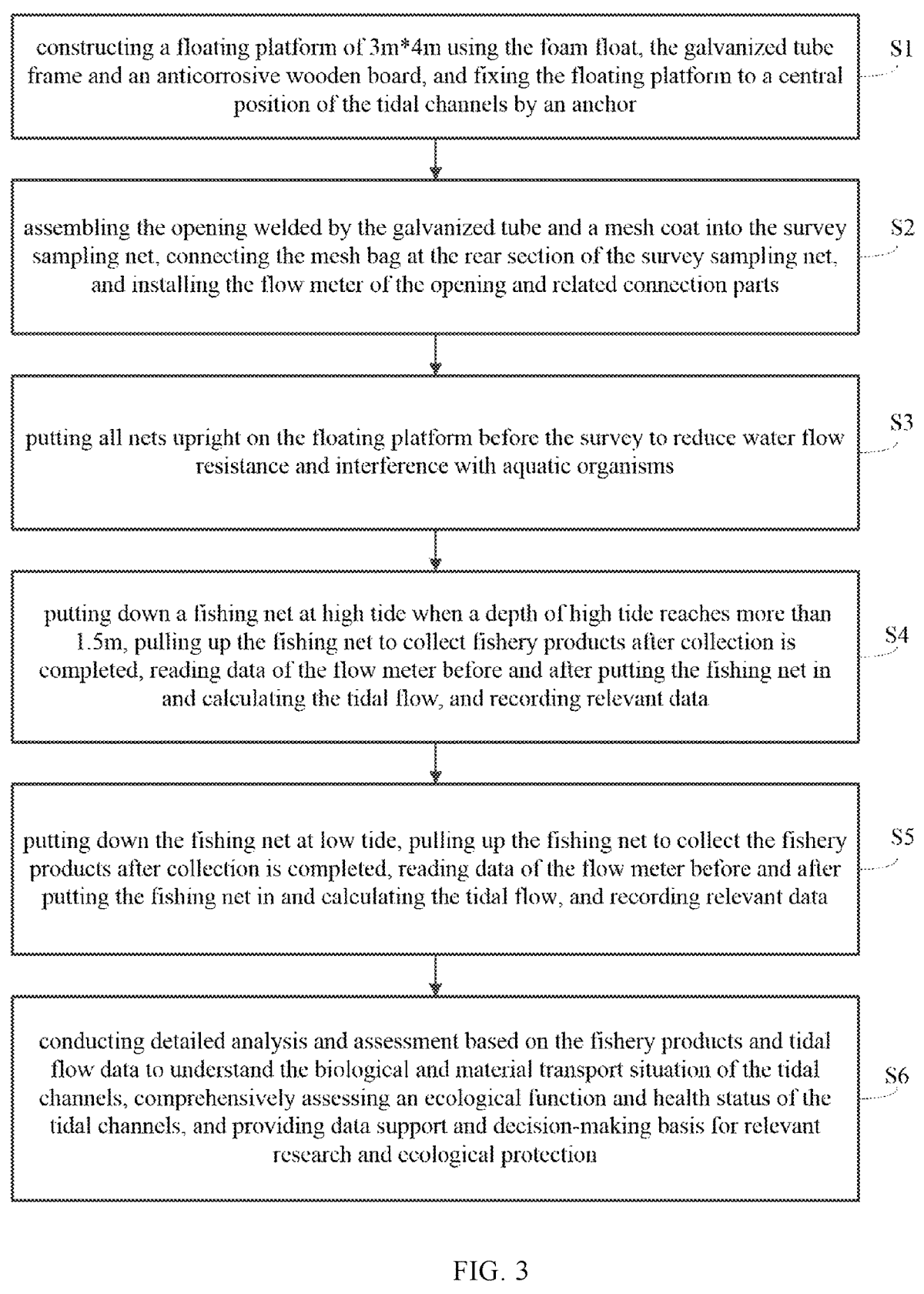

| | |
|---|---|
| constructing a floating platform of 3m*4m using the foam float, the galvanized tube frame and an anticorrosive wooden board, and fixing the floating platform to a central position of the tidal channels by an anchor | S1 |

| | |
|---|---|
| assembling the opening welded by the galvanized tube and a mesh coat into the survey sampling net, connecting the mesh bag at the rear section of the survey sampling net, and installing the flow meter of the opening and related connection parts | S2 |

| | |
|---|---|
| putting all nets upright on the floating platform before the survey to reduce water flow resistance and interference with aquatic organisms | S3 |

| | |
|---|---|
| putting down a fishing net at high tide when a depth of high tide reaches more than 1.5m, pulling up the fishing net to collect fishery products after collection is completed, reading data of the flow meter before and after putting the fishing net in and calculating the tidal flow, and recording relevant data | S4 |

| | |
|---|---|
| putting down the fishing net at low tide, pulling up the fishing net to collect the fishery products after collection is completed, reading data of the flow meter before and after putting the fishing net in and calculating the tidal flow, and recording relevant data | S5 |

| | |
|---|---|
| conducting detailed analysis and assessment based on the fishery products and tidal flow data to understand the biological and material transport situation of the tidal channels, comprehensively assessing an ecological function and health status of the tidal channels, and providing data support and decision-making basis for relevant research and ecological protection | S6 |

FIG. 3

FLOATING PLATFORMS FOR SAMPLING FISH SURVEY IN TIDAL CHANNELS AT HIGH AND LOW TIDES AND QUANTITATIVE ASSESSMENT METHOD

CROSS-REFERENCE TO RELATED APPLICATIONS

The present application claims priority to Chinese Patent Application No. 202411077371.X, filed on Aug. 7, 2024, the entire disclosure of which is incorporated herein by reference.

TECHNICAL FIELD

The present application relates to the technical field of fish surveys in tidal channels, specifically a floating platform for sampling fish survey in tidal channels at high and low tides and a quantitative assessment method.

BACKGROUND

As an important habitat type of estuarine salt marsh wetlands, the tidal channels provide the function of a transportation channel for aquatic organisms such as fish and various types of nutrients to and from the estuarine salt marsh wetlands. Under the action of periodic high and low tides, the biological and nutrient elements are exchanged between the tidal channels and its neighboring patches, which on the one hand, provides a variety of habitat choices for the needs of the fish community for spawning, bait solicitation, and sheltering, and on the other hand, improves the availability of wetland nutrient resources for fish communities. Therefore, researchers have shown great interest in the ecological function of the tidal channels and conducted a series of related studies to analyze the functional characteristics of aquatic communities, nutrients, and connectivity in the tidal channels, which are generally believed that the tidal channels provide a good bait solicitation, growth, fattening, and refuge for the estuarine aquatic organisms, especially for the small-sized fishes and juvenile fishes, so that the population exhibits a high abundance, growth rate, and survival rate. As a result, the estuarine wetland plays its important role as a nursery ground.

However, due to the imperfect means of investigation and monitoring, the current research mainly focuses on setting fixed nets in the tidal channels and entering the tidal channels after the tide has receded to collect the fishery products that enter the nets with the tide during low tide, but there is a lack of detailed research on the substances and organisms that enter the tidal channels with the tide during the high tide due to the limitation of the investigation method, and there is a lack of quantitative evaluation of the biological and material transport effects of the high and low tides. Therefore, it is necessary to propose floating platforms for sampling fish survey in tidal channels at high and low tides and a quantitative assessment method to solve the problems in the existing technology.

SUMMARY

The purpose of the present application is to make up for the deficiencies of the existing technology, and provide a floating platforms for sampling fish survey in tidal channels at high and low tides and quantitative assessment method, which can carry out effective survey sampling at both high and low tides, and the structure of the survey sampling net and the connection method with the floating platform make the collection of aquatic organisms and nutrients more comprehensive, and provide a scientific basis for the quantitative assessment of the biological and material transport effects of high and low tides.

In order to solve the above technical problems, the present application provides the following technical solutions: a floating platform for sampling fish survey in tidal channels at high and low tides, which includes a floating platform frame and a survey sampling net, the survey sampling net includes an opening welded by galvanized tubes, and two ends of the opening welded by galvanized tubes are provided with circular bearings, and the survey sampling net and the floating platform frame are connected with galvanized tubes and circular bearings; and the opening of the survey sampling net rotates, retracts and drops down by a cable, the floating platform is constructed from a foam float, a galvanized tube frame, and an anticorrosive wooden board, and fixed to a center of the tidal channels by anchors around a perimeter, and the floating platform frame is welded with iron rings for securing a cable.

A method for quantitative assessment of fish in tidal channels at high and low tides, using the floating platform as mentioned above, includes:

S1, constructing a floating platform of 3 m*4 m using the foam float, the galvanized tube frame and an anticorrosive wooden board, and fixing the floating platform to a central position of the tidal channels by an anchor;

S2, assembling the opening welded by the galvanized tube and a mesh coat into the survey sampling net, connecting the mesh bag at the rear section of the survey sampling net, and installing the flow meter of the opening and related connection parts;

S3, putting all nets upright on the floating platform before the survey to reduce water flow resistance and interference with aquatic organisms;

S4, putting down a fishing net at high tide when a depth of high tide reaches more than 1.5 m, pulling up the fishing net to collect fishery products after collection is completed, reading data of the flow meter before and after putting the fishing net in and calculating the tidal flow, and recording relevant data;

S5, putting down the fishing net at low tide, pulling up the fishing net to collect the fishery products after collection is completed, reading data of the flow meter before and after putting the fishing net in and calculating the tidal flow, and recording relevant data; and S6, conducting detailed analysis and assessment based on the fishery products and tidal flow data to understand the biological and material transport situation of the tidal channels, comprehensively assessing an ecological function and health status of the tidal channels, and providing data support and decision-making basis for relevant research and ecological protection.

Compared with the related art, the floating platform for sampling fish survey in tidal channels at high and low tides and the quantitative assessment method have the following beneficial effects:

The present application can comprehensively collect aquatic organisms and nutrients in the tidal channels at high tide and low tide by setting up a floating platform to put down the corresponding fishing nets for collection at high tide and low tide respectively, and read the flow meter data for calculating the tidal flow, which can make up for the insufficiency of the relevant data collection in the existing research at high tide, and realize accurate monitoring and quantitative assessment of the tidal channels organisms and material transport, and can comprehensively understand the species, quantity and distribution of the tidal channels organisms and their differences in high and low tide, so as to deeply understand the tidal channels organisms and the quantitative assessment of the tidal channels organisms, and provide important data support and decision-making basis for relevant research and ecological protection.

Other advantages, objects and features of the present application will to some extent be set forth in the ensuing specification, and to some extent will be apparent to a person skilled in the art based on an examination of the following, or can be taught from the practice of the present application.

BRIEF DESCRIPTION OF THE DRAWINGS

In order to more clearly illustrate the technical solutions in the embodiments or prior art of the present application, the accompanying drawings to be used in the description of the embodiments or prior art will be briefly described below. Obviously, the accompanying drawings in the following description are only some of the embodiments of the present application, and other accompanying drawings can be obtained based on these drawings without creative labor for those skilled in the art.

FIG. 3 is a schematic flow diagram of a quantitative assessment method for fish in tidal channels at high and low tides.

DETAILED DESCRIPTION OF THE EMBODIMENTS

Figure 1:
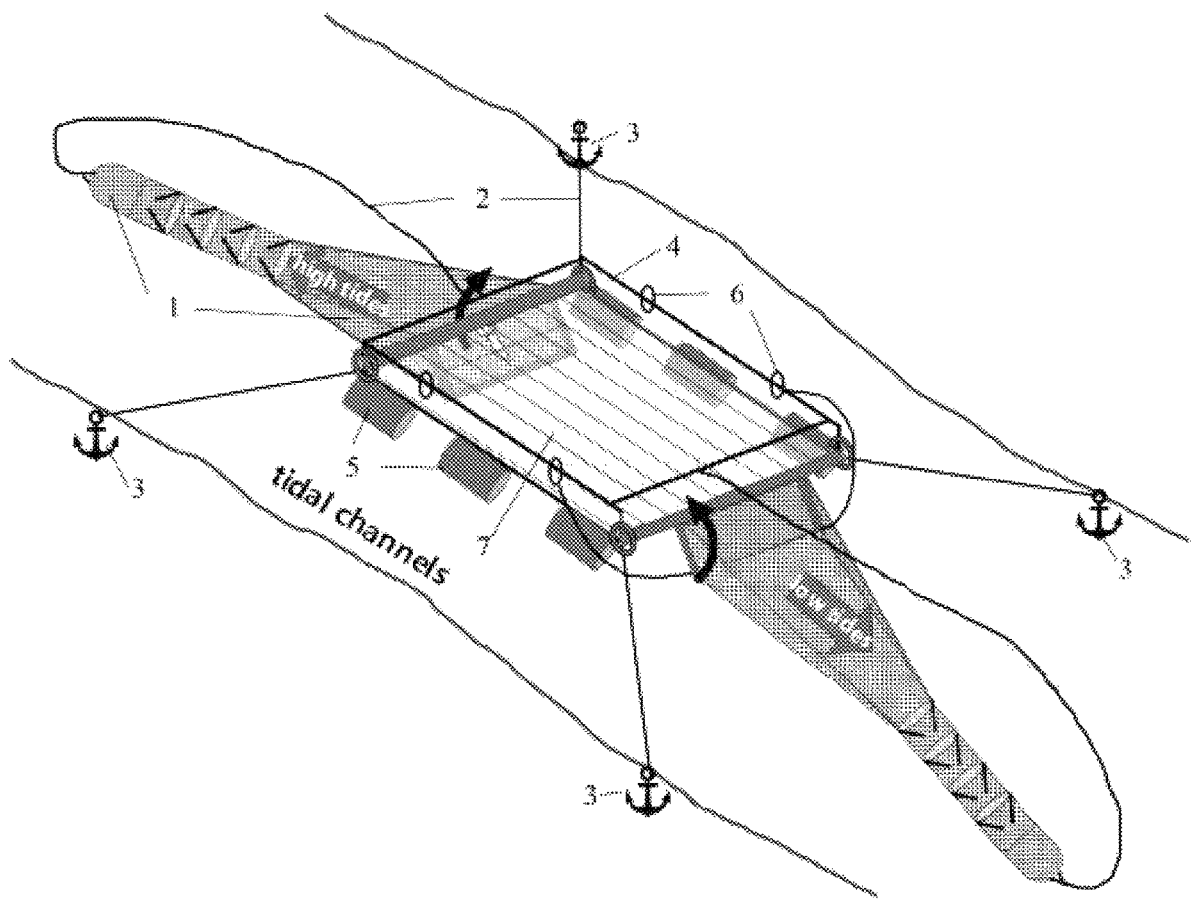
FIG. 1 is a schematic structural diagram of a floating platform for sampling fish survey in tidal channels at high and low tides.
Figure 2:
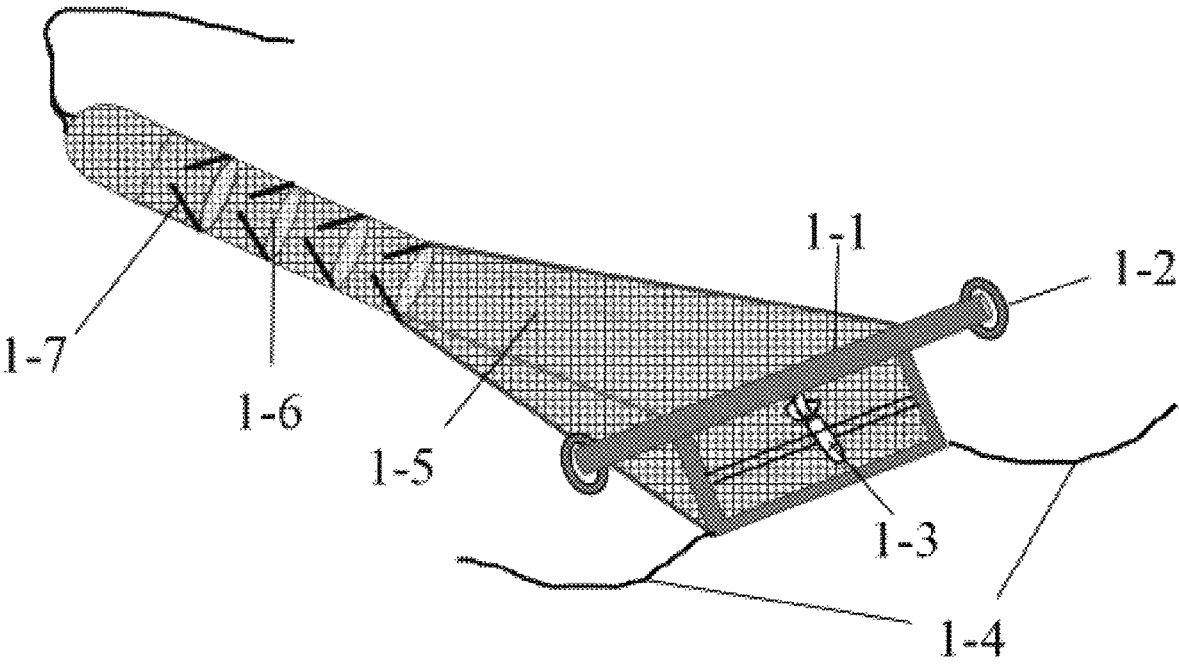
FIG. 2 is a schematic structural diagram of a survey netting used in floating platform for sampling fish survey in tidal channels at high and low tides.

The technical solutions in the embodiments of the present application will be described clearly and completely in the following, and it is obvious that the described embodiments are only a part of the embodiments of the present application and not all of the embodiments. Based on the embodiments in the present application, all other embodiments obtained by those skilled in the art without making creative labor are within the scope of the present application.

Embodiment I

A floating platform for sampling fish survey in tidal channels at high and low tides includes a floating platform frame (3 m*4 m) and a survey sampling net, the survey sampling net includes an opening (1.5 m*2.0 m) welded by a galvanized tube, with circular bearings provided at each end of the opening welded by the galvanized tube, the survey sampling net and the floating platform frame are connected by the galvanized tube and the circular bearings, a flow meter is provided at the opening of the survey sampling net, the outer surface of the opening of the survey sampling net is provided with a nylon rope, the nylon rope is fixed to the platform frame on the iron ring, the outer surface of the opening of the opening welded by the galvanized tube is provided with the fishing net pieces of diameter of 2 mm, the rear section of the survey sampling net connected to the net bag to accommodate the fishery products, an interior of the net bag is provided with a group of stainless steel ring, with a diameter of 50 cm, on each stainless steel ring, there is an inverted barb made of fishing net piece installed to prevent the fishery products in the net from swimming out. The opening of the survey sampling net can be rotated and retracted or lowered through a cable. The floating platform is constructed with foam buoys, a galvanized tube frame, and anti-corrosion wooden boards. It is fixed around the tidal creek by an anchor. A set of iron rings is welded on the frame of the floating platform.

Using the above floating platform, before the survey, all the nets are erected on the platform, sampler boards the floating platform during the low tide, when the depth of the high tide reaches more than 1.5 m, can be put down fishing nets at high tide through the cable, when collection is completed, can, through the cable, pull the nets up to the platform to collect the fishery products in the net bag, and read the flow meter before and after the number of calculations through the opening of the net of the tidal current flow, and wait until the low tide, and can put down the fishing net through the cable when the tide is low, and after the collection is completed, the fishing net can be pulled up to the platform by the cable to collect the fishery products in the net bag, and the data before and after the flow meter can be read to calculate the tidal flow through the opening of the net, which makes the floating platform able to carry out the effective investigation and sampling at both high and low tides, and the structure of the survey sampling net and the connection method with the floating platform make the collection of aquatic organisms and nutrients more comprehensive and more effective, and it is also useful for the quantitative assessment of biological and material transfer of the high and low tides. It provides a scientific basis for quantitative assessment of the biological and material transport effects of high and low tides.

Embodiment II

The present embodiment is based on the embodiment I to further expand the use method in detail.

A method for quantitative assessment of fish in tidal channels at high and low tides, using the floating platform in embodiment I. The method includes:

First, a floating platform of 3 m*4 m is constructed with a foam float, a galvanized tube frame, and an anticorrosive wood board, and fixed at a suitable location around the tidal channels by anchors to ensure that the platform is stable and not moved by the tide, the specific process includes: preparing the foam float, the galvanized tube frame, the anti-corrosive wood board, the iron ring, and nylon range rover cable material, constructing a frame of the floating platform using the galvanized tube to ensure that the frame is structurally stable, with a size of 3 m*4 m, the foam pontoon provided in the bottom of the frame, to provide sufficient buoyancy, so that the platform floats on the water surface, in the top of the frame paved with anticorrosive planks, it ensures that the anticorrosive planks flat and firmly fixed in the frame, to play a leveling and anti-skid role, in the floating platform around the installation of anchors, anchors will be fixed in the tidal channels in the appropriate location to ensure that the platform in the tide of the impact will not be moved, after the completion of construction, the stability and safety of the floating platform are carefully checked to ensure that it can meet the requirements of the survey sampling.

Then the opening welded by the galvanized tube is assembled with the mesh coat into a survey sampling net, the mesh bag is connected at the rear section of the net, and the mesh flow meter and related connection parts are installed to accurately measure the tidal flow, the specific process includes: preparing the opening (1.5 m*2.0 m) welded by the galvanized tube, the mesh coat composed of fishing mesh, the mesh bag, the mesh flow meter, and relevant connection parts, and assembling the frame of opening welded by the galvanized tube with the net clothes made of fishing nets, to ensure that the shape and size of the net opening meet the requirements, connecting the net bag in the rear section of the net to accommodate the fishery products, installing the flow meter at the opening to ensure that the flow meter can accurately measure the flow of tidal water passing through the opening, fixing the nylon ropes with the iron ring on the platform frame to ensure the operational stability of the fishing net, checking whether the various components of the survey sampling net are fixed and whether the net clothes are in good condition to ensure that the survey sampling net is not damaged, and whether the net clothes are in good condition, to ensure that the survey sampling net can be used normally.

Next, before the survey, all the nets are put up on the platform to reduce the resistance of the water flow and the interference of aquatic organisms, the specific process includes: checking whether the components of the floating platform and the survey sampling nets are in good condition, checking the operation status of the anchor, cable and flow meter, putting all the nets up on the floating platform to ensure that the nets are reasonably placed and do not affect the stability of the platform and the operation space, and preparing the containers necessary to collect the fishery products, checking the safety facilities on the floating platform, such as guard rails, etc., to ensure the safety of the sampler. The sampler boards the floating platform at low tide to get ready for survey, the sampler are familiar with the operation method of the cable, and the readings of the flow meter and the way of data recording, observing the environment of the tidal channels, including the trend of the tide and the speed of the water flow, and reasonably arranging the investigation time and operation steps.

Then, putting down the fishing net at high tide when the depth of the high tide reaches 1.5 m or more, pulling the net to collect the fishery products after the collection is completed, reading data of the flow meter and calculating the tidal flow, recording the relevant data, the specific process includes: the sampler closely observing the tidal situation, and preparing the next step of the operation when the depth of the high tide reaches 1.5 m or more, putting down the fishing net at high tide by the cable, and the fishing net entering into the water smoothly and being unfolded to a suitable position, in the process of high tide, letting the fishing net fully collect the aquatic organisms and nutrients that enter with the tide, when the collection is completed, pulling the fishing net up to the platform through the cable, carefully taking out the fishery products in the net bag and putting it into the prepared container to read the data before and after the flow meter of the opening, according to the readings of the flow meter, calculating the tidal flow through the opening, and the type of the fishery products, quantity and recording the data of the tide flow in detail.

When the tide is at low, putting down the fishing net at the low tide, pulling the net to collect the fishery products after completing the collection, reading the flow meter data and calculating the flow of tidal water body, record the relevant data, the specific process includes: sampler closely observe the tide, waiting for the time of ebbing, when the tide begins to ebb, putting down the fishing net at the low tide through the cable, so that it enters into the water and unfolds, in the process of low tide, letting the fishing net to collect the aquatic organisms and substances that exit with the tide, after collection of completion, the nets are pulled up to the platform by cables, the fishery products are taken out from the net bags and put into the corresponding containers, the data from the flow meter at the opening of the net are read and recorded, the tidal flow through the opening is calculated based on the readings from the flow meter, and the types and quantities of fishery products and the tidal flow data obtained from the low tide are recorded in detail.

Finally, based on the fishery products and tidal flow data, detailed analysis and evaluation are carried out to understand the biological and material transport in the tidal channels, the ecological function and health status of the tidal channels are comprehensively assessed, and data support and decision-making basis for the relevant research and ecological protection are provided, the specific process includes: sorting and classifying the data of fish species and quantity recorded in the high tide and low tides, statistically analyzing the species and quantity of the fishery products, calculating the frequency of occurrence and quantity distribution index of each fish species, analyzing the change of tidal flow, including the difference of the flow during high tide and low tide, and the trend of the flow over time, and exploring the correlation between the species and quantity of fishery products and the tidal flow, in order to understand the relationship between the biology of the tidal channels and the material transport.

The correlation coefficient is calculated between the number of fishery products and the tidal flow using the Pearson correlation coefficient to determine the strength of the correlation between them, e.g. "calculating the Pearson correlation coefficient between the number of fishery products and the tidal flow according to the formula $$\frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}},$$

where $x_i$ denotes the number of observations of the number of fishery products, $y_i$ denotes the number of observations of the tidal flow, and $\bar{x}$ and $\bar{y}$ denotes the mean values of the number of fishery products and the tidal flow, respectively, n denotes the number of observation, the correlation strength between the quantity of the catch and the tidal water flow can be determined through the calculated correlation coefficient r.

Through the above steps, the aquatic organisms and nutrients in the tidal channels at high and low tides can comprehensively collect aquatic organisms and nutrients in the tidal channels at high tide and low tide, which can make up for the insufficiency of the relevant data collection in the existing research at high tide, and realize accurate monitoring and quantitative assessment of the tidal channels organisms and material transport, and can comprehensively understand the species, quantity and distribution of the tidal channels organisms and their differences in high and low tide, so as to deeply understand the tidal channels organisms and the quantitative assessment of the tidal channels organisms, and provide important data support and decision-making basis for relevant research and ecological protection.

To those skilled in the art, it is apparent that the present application is not limited to the details of the above embodiments, and that it is capable of realizing the present application in other specific forms without departing from the spirit or essential features of the present application. Accordingly, the embodiments are to be regarded as exemplary and non-limiting in every point of view, and the scope of the present application is limited by the appended claims and not by the foregoing description, and is therefore intended to encompass all variations falling within the meaning and scope of the same essentials of the claims. Any accompanying markings in the claims should not be regarded as limiting the claims involved.

What is claimed is:

1. A method for quantitative assessment of fish in tidal channels at high and low tides, using a floating platform for sampling fish survey in tidal channels at high and low tides, the floating platform comprising a floating platform frame and a survey sampling net;

wherein the survey sampling net comprises an opening welded by galvanized tubes, and two ends of the opening welded by galvanized tubes are provided with circular bearings, and the survey sampling net and the floating platform frame are connected with galvanized tubes and circular bearings;

wherein the opening of the survey sampling net rotates, retracts and drops down by a cable; a mesh bag is attached to a rear section of the survey sampling net, and a set of stainless steel rings are provided on an inside of the mesh bag, and each stainless steel ring is provided with an inverted whisker made of fishing mesh sheets;

wherein the floating platform is constructed from a foam float, a galvanized tube frame, and an anticorrosive wooden board, and fixed to a center of the tidal channels by anchors around a perimeter, and the floating platform frame is welded with a set of iron rings;

wherein a flow meter is provided at the opening of the survey sampling net, a nylon rope is provided on an outer surface of the opening of the survey sampling net, the nylon rope is fixed to the iron ring on the platform frame, and a fishing net is provided on the outer surface of the opening of the survey sampling net welded by galvanized tubes;

the method comprising:

S1, constructing the floating platform of 3 m*4 m using the foam float, the galvanized tube frame and the anticorrosive wooden board, and fixing the floating platform to a central position of the tidal channels by the anchors;

S2, assembling the opening welded by the galvanized tube and a mesh coat into the survey sampling net, connecting the mesh bag at the rear section of the survey sampling net, and installing the flow meter of the opening and related connection parts;

S3, putting all nets upright on the floating platform before the survey to reduce water flow resistance and interference with aquatic organisms;

S4, putting down the fishing net at high tide when a depth of high tide reaches more than 1.5 m, pulling up the fishing net to collect fishery products after collection is completed, reading data of the flow meter before and after putting the fishing net in and calculating the tidal flow, and recording read data at the high tide;

S5, putting down the fishing net at low tide, pulling up the fishing net to collect the fishery products after collection is completed, reading data of the flow meter before and after putting the fishing net in and calculating the tidal flow, and recording read data at the low tide; and S6, conducting detailed analysis and assessment based on the fishery products and tidal flow data to understand the biological and material transport situation of the tidal channels, assessing an ecological function and health status of the tidal channels, and providing data support and decision-making basis for research and ecological protection;

wherein the S6 conducting detailed analysis comprises:

organizing and classifying species and quantity of fishery products and the tide flow data recorded in the high tide and the low tide;

counting the types and quantities of fishery products, and calculating the frequency of occurrence and quantity distribution index of each fish species;

analyzing changes in tidal flow, comprising a difference in flow at high and low tide, and a trend of flow over time; and finding the correlation between fishery products species and numbers and tidal flows to obtain a relationship between biological and material transport in the tidal channels.

2. The method according to claim 1, wherein the S1 constructing the floating platform comprises:

preparing the foam float, the galvanized tube frame, the anticorrosive wooden board, the iron ring, and a nylon rangefinder cable material;

using the galvanized tube to build a frame for the floating platform with the size of 3 m*4 m;

installing the foam float at a bottom of the frame to provide buoyancy to float the platform on the water surface;

laying anticorrosive wooden boards on a top of the frame, installing the anchors around the floating platform, and fixing the floating platform to the central position of the tidal channels through the anchors; and after completing construction, checking the stability and safety of the floating platform.

3. The method according to claim 1, wherein the S2 assembling the survey sampling net comprises:

preparing the opening welded by the galvanized tube, a net coat composed of fishing mesh, a net bag, a flow meter of the opening, and connection parts;

assembling the opening frame welded by the galvanized tube with the net coat composed of fishing mesh, attaching the net bag to the rear section of the net for holding the fishery products, and installing the flow meter at the opening of the net; and fixing the nylon rope with the iron ring on the platform frame and checking whether the parts of the survey sampling net are fixed.

4. The method according to claim 1, wherein the S3 putting all nets upright on the floating platform comprises:

checking whether the components of the floating platform and the survey sampling net are intact, and checking an operation status of the anchors, the cable, and the flow meter;

placing all nets upright on the floating platform and preparing containers for collecting the fishery products;

checking safety facilities on the floating platform and samplers board the floating platform at low tide to prepare for the survey; and observing environmental conditions of the tidal channels, comprising a trend of the rising and falling tides and a speed of water flow, and arranging survey time and operation steps.

5. The method according to claim 1, wherein the S4 putting down the fishing net at low tide comprises:

the samplers observing the tidal water situation and preparing for a next operation when the depth of the high tide reaches 1.5 m or more;

lowering the fishing net at the high tide by the cable, the fishing net entering the water and unfolding to a position;

during a course of the high tide, allowing the net to collect the aquatic organisms and nutrients that enter with the tide;

when collection is finished, pulling the net onto the platform by the cable and removing the fishery products from the net bag and placing into a prepared container;

reading numbers before and after the flow meter at the opening of the net, and calculating the tidal flow through the opening of the net based on the flow meter readings; and recording the type and quantity of fishery products and the flow data of the tidal.

6. The method according to claim 1, wherein the S5 putting down the fishing net at low tide comprises:

the sampler observing the tide and waits for the time of low tide;

when the low tide begins, lowering the low tide fishing net by means of a cable so that it enters the water and unfolds;

during the low tide, allowing the fishing net to collect aquatic organisms and nutrients that exit with the tide;

when collection is complete, pulling up the nets onto the platform by the cable, and removing the fishery products from the net bag and placed in the container;

reading the numbers before and after the flow meter at the opening of the net and recording them, and calculating the tidal flow through the opening of the net according to the readings of the flow meter; and making a record of the type and quantity of fishery products and the tidal flow data obtained from the low tide.

* * * * *